United States Patent [19]

Lancien et al.

[11] Patent Number: 5,796,045

[45] Date of Patent: Aug. 18, 1998

[54] BRAIDED SHEATH SLEEVE FOR THREADING OVER AT LEAST ONE ELONGATE ELEMENT TO BE PROTECTED, AND A METHOD OF MANUFACTURING SUCH A SLEEVE

[75] Inventors: Jean-Claude Lancien, Cuvergnon; Christian Guillemin, Saint-Ouen, both of France

[73] Assignee: Gremco S.A., France

[21] Appl. No.: 780,791

[22] Filed: Jan. 9, 1997

[30] Foreign Application Priority Data

Jan. 10, 1996 [FR] France ............................. 96 00206

[51] Int. Cl.⁶ .................................................. B32B 31/20
[52] U.S. Cl. .................. 174/109; 174/136; 174/DIG. 8; 156/86
[58] Field of Search .................................. 174/107, 136, 174/109, DIG. 8; 156/86

[56] References Cited

U.S. PATENT DOCUMENTS

| 3,466,210 | 9/1969 | Wareham | 156/86 |
| 3,861,972 | 1/1975 | Glover et al. | 156/86 |
| 4,144,404 | 3/1979 | De Groef | 174/88 C |
| 4,636,271 | 1/1987 | Gandolfo | 156/73.1 |
| 4,836,872 | 6/1989 | Landry et al. | 156/85 |
| 4,896,904 | 1/1990 | Gadsden et al. | 285/381.5 |
| 5,414,211 | 5/1995 | Chan | 174/36 |

FOREIGN PATENT DOCUMENTS

| 901 683 | 5/1985 | Belgium . |
| 1 237 263 | 5/1988 | Canada . |
| 0172039 | 2/1986 | European Pat. Off. . |

*Primary Examiner*—Bot L. Ledynh
*Assistant Examiner*—Joseph Waks
*Attorney, Agent, or Firm*—Sixbey, Friedman, Leedom & Ferguson, P.C.; Gerald J. Ferguson, Jr.; Tim L. Brackett, Jr.

[57] ABSTRACT

The invention relates to a sleeve of braided sheath having at least one expanded end whose diameter is greater than the nominal diameter of the sheath; the expanded end includes a certain quantity of adhesive between its component filaments and it is surrounded, at least up to its free edge, by a ring of heat-shrink plastics material. The ring is shrunk in part only so as to be capable of being heat shrunk again once the sleeve has been put into place, thereby clamping the expanded end and fixing the position of said sleeve.

13 Claims, 3 Drawing Sheets

FIG.4a    FIG.4b    FIG.4c    FIG.4d
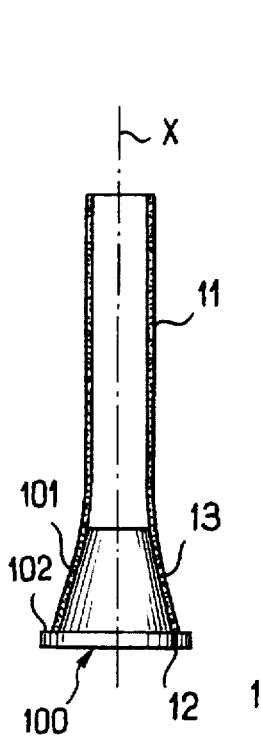
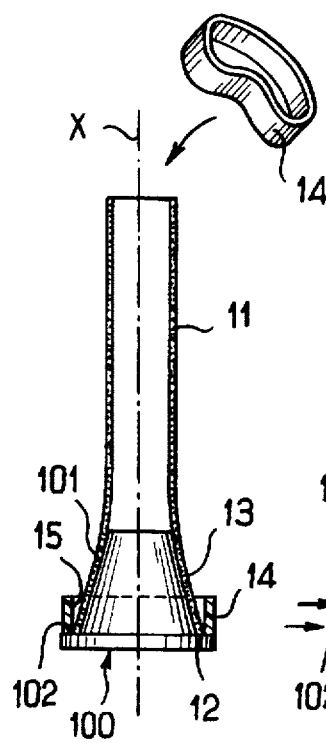
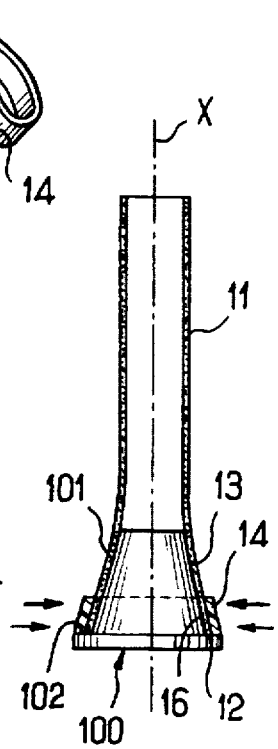
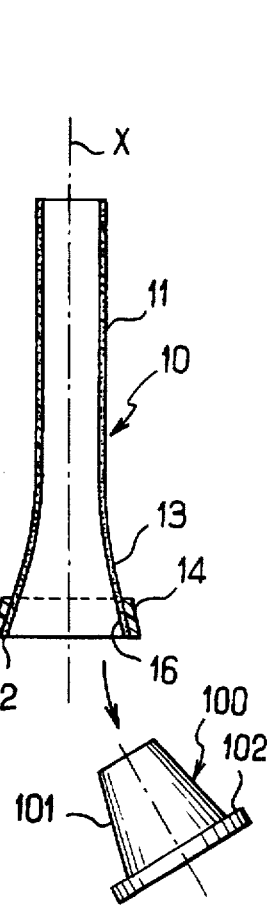
FIG.5
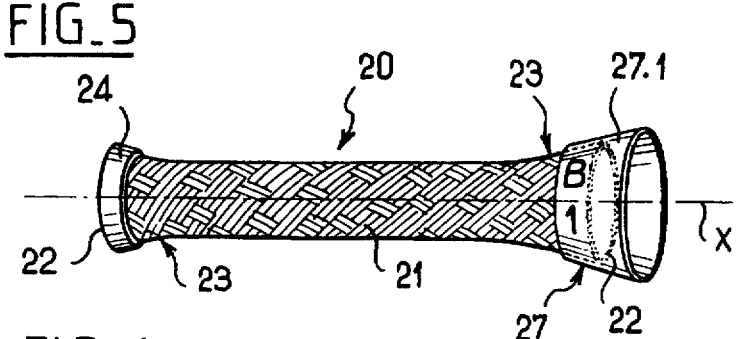
FIG.6
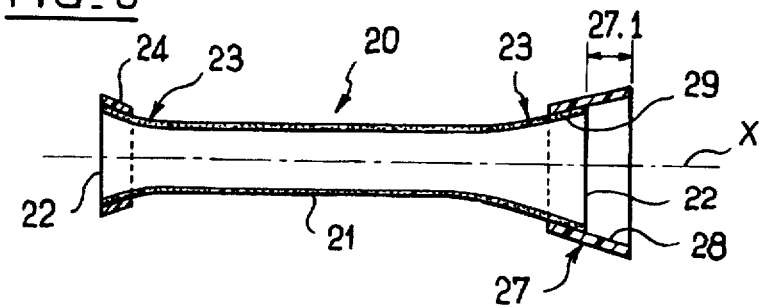

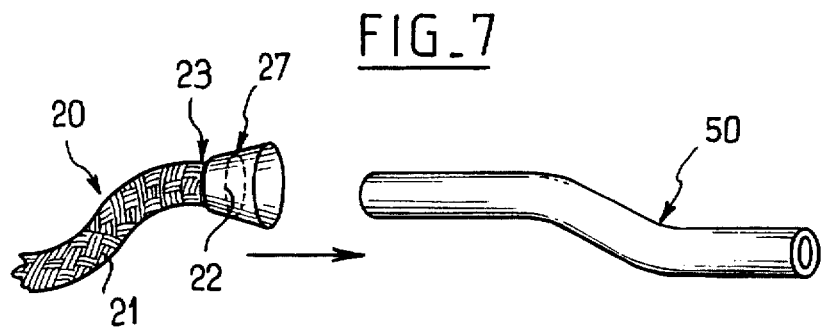
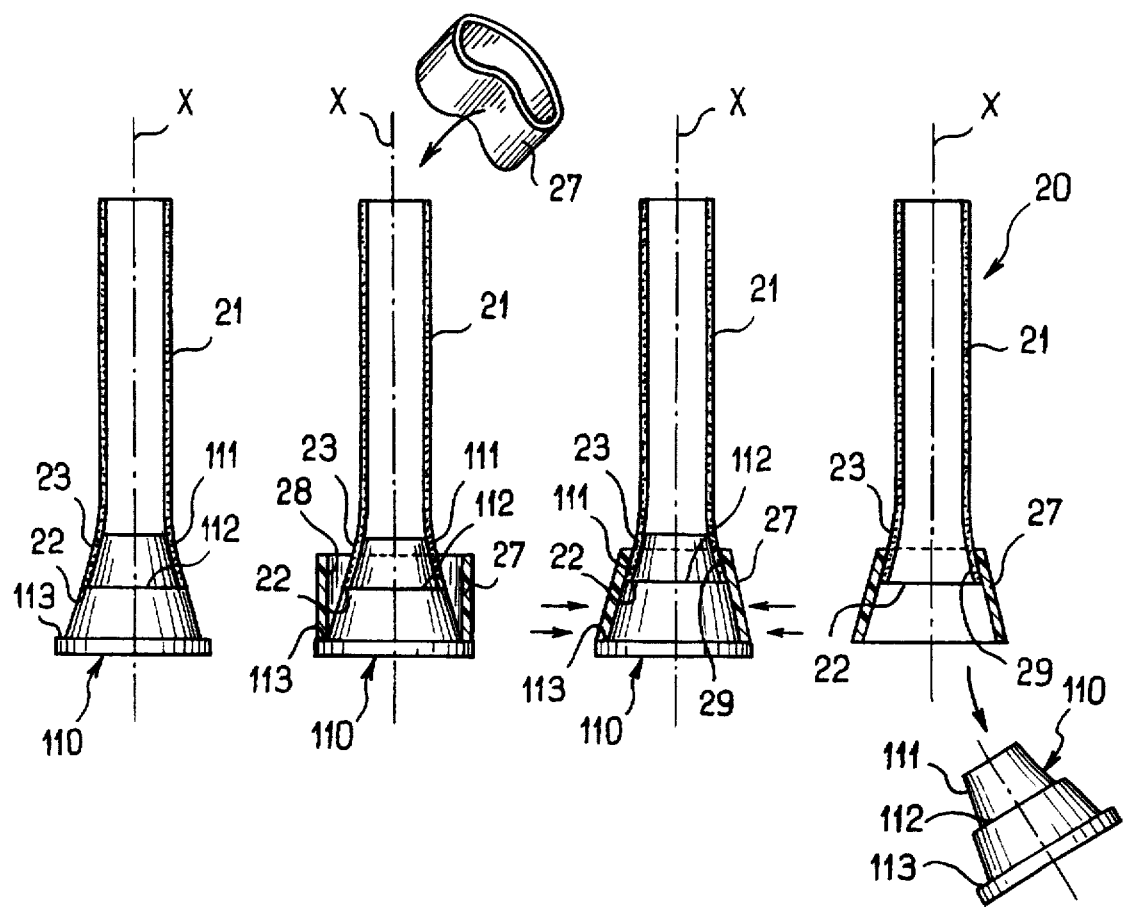

BRAIDED SHEATH SLEEVE FOR THREADING OVER AT LEAST ONE ELONGATE ELEMENT TO BE PROTECTED, AND A METHOD OF MANUFACTURING SUCH A SLEEVE

FIELD OF THE INVENTION

The invention relates to protective sleeves, and more specifically to braided sheath sleeves for threading over at least one elongate element.

The elongate elements concerned that are to be protected may be constituted, for example, by pipes, tubes, or couplings serving for conveying liquid or gaseous fluids. In the particular case of motor vehicles, such elements are present for conveying fuel, water, air, or other fluids or gaseous mixtures. It is then commonplace to thread a protective sleeve over at least a portion of the length of such tubes, couplings, or pipes, with the protection provided being mechanical and/or thermal and/or acoustic.

The elongate elements may also be in the form of bundles, as applies to small tubes and above all to electrical wiring. The protective sleeve is then threaded over the bundle and holds the tubes or wiring constituting the bundle together to a greater or lesser extent.

BACKGROUND OF THE INVENTION

The field of car manufacture is typically concerned by the use of protective sleeves, in particular sleeves of braided sheath. The protected elements need to occupy as little space as possible, while nevertheless withstanding rubbing and heating. The protective sleeves then need to be positioned accurately on the elements to be protected, and their positions must remain stable in spite of the inevitable vibration.

Several types of solution have already been developed on an industrial scale.

Mention may be made firstly of engaging the elements that are to be protected in a heat-shrink sheath. That solution is cheap, but assembly is difficult to perform. In addition, if the element to be protected is a flexible hose, then the presence of a heat-shrunk protective sheath over all or part of its length has the effect of making the hose rigid so as to lose shape flexibility. Finally, the mechanical protection provided is limited, and in any event much less than that which can be provided by a braided sheath sleeve, and thermal protection is substantially non-existent.

Mention may also be made of using a tube that is threaded onto the element or bundle of elements to be protected. Such a tube gives rise to considerable extra thickness particularly when the entire length of the element or bundle of elements is concerned. If only a portion of the length is concerned, it is then also necessary to provide fixing elements (collars, heat-shrink rings, adhesive tape) at the ends of the tube.

Finally, mention must be made of braided sheath sleeves which can be made of plastics material, of metal, of textile material, or of a mixture of such materials, which may optionally be coated. Such sleeves are usually difficult to thread onto the element(s) to be protected. The free edge of a sleeve generally presents a peripheral weld at the ends of its component strands in order to prevent fraying: this has the effect of fixing the diameter of the end of the sleeve and of preventing the expansion that could otherwise easily be obtained by compressing the sleeve along its longitudinal axis (the "push-back" effect), thus making it difficult to thread the sleeve on a tube or a bundle whose outside diameter is slightly smaller than the nominal diameter of the braided sheath sleeve. If it is desired to flare the end of the sleeve in order to facilitate threading, it is then necessary to omit end welding, so the end is ruffled to a greater or lesser extent depending on the type of strands from which the braided sheath is made. Also, such braided sheath sleeves often have the property of sliding over the element to be protected, particularly if the element is subjected to vibration: this makes it necessary to provide additional members (metal collars, plastics rings, adhesive tape, self-amalgamating tape, etc.) at the ends of the sleeve to clamp the ends onto the element to be protected.

Proposals have thus been made to use a heat-shrink ring disposed in the vicinity of the end of a braid in order to fix said braid to the end of a metal bar, in particular as described in document BE-A-901 683.

Document U.S. Pat. No. 4,144,404 describes an analogous technique for connecting electric cables, with reinforcing braid threaded in part onto each end of a metal tube, and with an outer envelope that is heat-shrinkable to clamp the other end of the braid on a cable.

Documents U.S. Pat. No. 4,836,872 and EP-A-0 172 039 describe connection techniques using a heat-shrink outer envelope surrounding a reinforcing braid.

To fill out the technological background of the invention, mention may finally be made of document U.S. Pat. No. 3,466,210 which describes making a woven insulating sleeve made from fiber material warp threads and heat-shrink material weft threads, said sleeve being coated in a special resin or varnish, and also of document U.S. Pat. No. 3,861,972 which describes making a catheter endpiece with tubular sleeves being shrunk onto the flexible tube of the catheter.

OBJECTS AND SUMMARY OF THE INVENTION

A particular aim of the invention is to solve the above-specified problem by designing a braided sheath sleeve that does not present the above-mentioned drawbacks and/or limitations.

An object of the invention is thus to provide a braided sheath sleeve which is both convenient to thread and simple to fix once put into place, with this applying to a very wide variety of types of braided sheath.

According to the invention, the problem is solved by a braided sheath sleeve for threading over at least one elongate element to be protected, wherein the sleeve has at least one expanded end whose diameter is greater than the nominal diameter of the sheath, which expanded end includes a certain quantity of adhesive between its component elements and is surrounded, at least as far as its free edge, by a ring of heat-shrink plastics material, said ring being shrunk in part only so as to be capable subsequently of being heat-shrunk once the sleeve has been put into place on the elongate element(s) to clamp the expanded end and fix said sleeve in position.

In a particular embodiment, the ring has an inside face coated in an adhesive which melts at the shrink temperature of said ring. In a variant, the ring has a heat-fusible inside wall so that the inside face is adhesive at the shrink temperature of said ring.

In another embodiment, the ring has an inside face that is not adhesive at the shrink temperature of said ring, and the adhesive provided between the component filaments is selected so as to flow at said shrink temperature.

In a first type of variant, the ring stops at the free edge of the expanded end.

In another type of variant, the ring extends beyond the free edge of the expanded end. The extension provided in this way can be flared so as to constitute a genuine threading endpiece that further facilitates installing the sleeve.

In this case, the extension of the ring may contribute to fixing the sleeve in position by means of an adhesive provided on its inside face, or in a variant it may constitute a discardable piece that is eliminated once the sleeve has been put into place.

Also, it may be advantageous for the ring to be externally marked and/or provided with identifying color.

Naturally, it is also possible to provide for both ends of the braided sheath sleeve to be expanded, each being surrounded by a respective heat-shrink ring whose inside face is optionally adhesive when hot.

The invention also provides a method of manufacturing a sleeve having at least one of the above characteristics, starting from a length of braided sheath.

For a ring whose inside face is adhesive, the method is more specifically remarkable by the following successive steps:

one end of the length of braided sheath is threaded on a shaping mandrel so as to expand said end;

a heat-shrink ring having an inside face that is adhesive when hot is threaded via the opposite end of the length so as to surround the expanded end at least as far as the free edge thereof;

the expanded end coated in this way is heated until the ring heat-shrinks, with the adhesive of said ring melting;

the expanded end is cooled to stabilize the circumferential size of the ring and to set the adhesive of said ring; and the shaping mandrel is withdrawn from the corresponding end of the length of braided sheath.

When the ring has an inside face that is not adhesive at the shrink temperature of said ring, the method comprises the following successive steps:

one end of the length of braided sheath is threaded on a shaping mandrel so as to expand said end;

a certain quantity of adhesive is deposited on the end expanded in this way;

a heat-shrink ring is threaded via the opposite end of the length to surround the adhesive-coated expanded end at least up to the free edge thereof;

the expanded end coated in this way is heated until the ring heat-shrinks, with the adhesive deposited on said end melting;

the expanded end is cooled to stabilize the circumferential size of the ring and to set the adhesive included at said end; and the shaping mandrel is withdrawn from the corresponding end of the length of braided sheath.

In a variant, the above method is modified by replacing the first two steps by the following two steps:

one end of the length of braided sheath is dipped in a bath of adhesive; and the end coated in adhesive in this way is threaded on a shaping mandrel so as to expand said end.

BRIEF DESCRIPTION OF THE DRAWINGS

Other characteristics and advantages of the invention appear more clearly in the light of the following description and the accompanying drawings relating to a particular embodiment, and with reference to the figures, in which:

FIGS. 4a to 4d are diagrams showing the steps of manufacturing a sleeve of the above-specified type from a length of braided sheath, using a method of the invention;

FIG. 5 is a perspective view of a variant braided sheath sleeve of the invention having two expanded ends, one of which is fitted with a ring that extends beyond the free end edge of the braided sheath;

FIG. 6 is an axial section of the FIG. 5 sleeve;

FIG. 7 shows the installation of such a sleeve on a tube, the sleeve having a braided sheath of structure that is very slack; and FIGS. 8a to 8d are diagrams showing the steps in manufacturing such a sleeve having an extended ring.

MORE DETAILED DESCRIPTION

Figure 1:
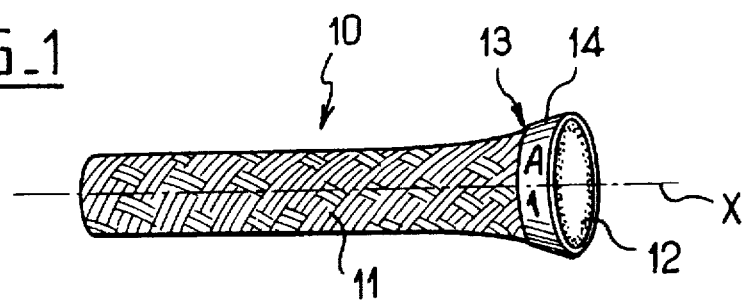
FIG. 1 is a perspective view of a braided sheath sleeve having an expanded end implemented in accordance with the invention.
Figure 2:
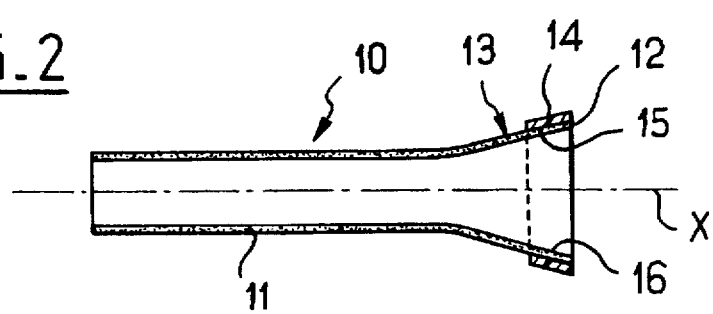
FIG. 2 is an axial section of the sleeve of FIG. 1.

FIGS. 1 and 2 show a braided sheath sleeve 10 made in accordance with the invention, said sleeve being for threading over at least one elongate member that is to be protected. The sleeve 10 comprises a braided main portion 11 of essentially cylindrical shape whose main axis is referenced X. The braided sheath may be made of plastics material, of metal, or of material combining different substances (e.g. PET and cotton, or polyester and copper). It is possible to provide a coated material, in particular a braided sheath that is coated on the outside, e.g. with a coating of silicone elastomer for a fiberglass braid, providing said coating does not prevent the braided sheath from expanding.

According to an essential characteristic of the invention, the sleeve 10 has at least one expanded end 13 whose diameter is greater than the nominal diameter of the sheath, which expanded end includes a certain quantity of adhesive between its component filaments, and is surrounded (in this case at its free edge 12) by a ring 14 of heat-shrink plastics material, said ring being shrunk in part only so as to be capable of being heat-shrunk subsequently after the sleeve 10 has been put into place on the elongate element(s) to be protected, so as to clamp the expanded end 13 and fix the sleeve 10 in position by means of the adhesive and/or the clamping force exerted by the ring 14.

It can thus be seen that the expanded end 13 retains its shape in stable manner by means of the combination of the heat-shrink ring 14 which is shrunk partially only onto said expanded end 13, and of the adhesive provided between the component filaments.

In a first embodiment, the ring 14 has an inside face 15 which is adhesive. During the first stage of shrinking the ring 14, the adhesive can then migrate onto the expanded end 13 through the component filaments of the braided sheath, and particles of adhesive may also move as far as the inside face, referenced 16, of the braided sheath 11. The adhesive thus concerns the ends of the component fibers of the braided sheath so as to "freeze" its expanded shape which makes threading the sleeve on the elongate element(s) to be protected considerably easier. If provision is made therefor, the presence of adhesive at the inside face 16 of the length of sheath 11 can make it possible, during the final stage of shrinking the ring once the sleeve has been put into place on the elongate element(s), to achieve local adhesion simultaneously with the final shrinking of the end 13 of the sheath, thereby enabling the sleeve to be fixed in position on the element to be protected.

In another embodiment, the ring 14 presents an inside face 15 that is not adhesive at the shrink temperature of said ring, and the adhesive provided between the component filaments is selected so that it flows at said shrink temperature. Under such circumstances, the adhesive is thus directly deposited (e.g. by means of a brush or by dipping into a bath of adhesive) onto the expanded end 13 independently of the ring 14 having the non-adhesive inside face. As in the preceding embodiment, once the sleeve 10 has been put into place and during final shrinking of the ring 14, said sleeve is fixed in position by the adhesive and/or by the clamping forced exerted by the ring 14.

A braided sheath sleeve is thus provided that presents at least one expanded end fitted on the outside with a partially-shrunk ring, thereby making it very convenient to thread onto the elongate element(s) to be protected, and once the sleeve has been put into place, making it capable of returning to a normal sleeve shape of essentially constant section with the additional feature of bonding that fixes the position of the installed sleeve, thereby preventing any untimely sliding of said sleeve, e.g. under the effect of vibration imparted to the protected elements.

Figure 3A:
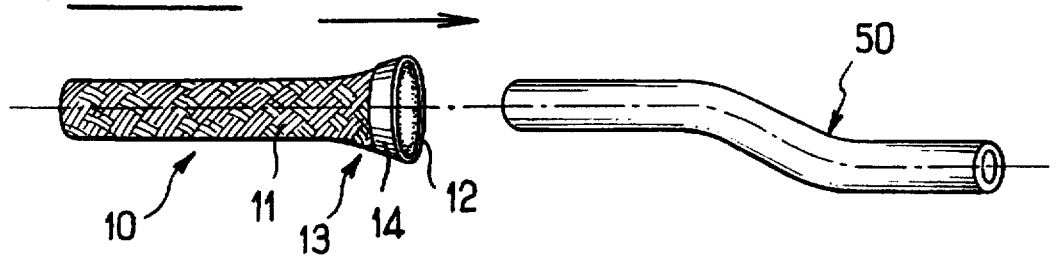
FIGS. 3a to 3c show the steps of installing such a sleeve on a tube.
Figure 3B:
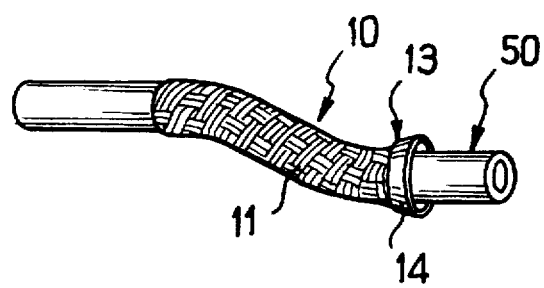
Figure 3C:
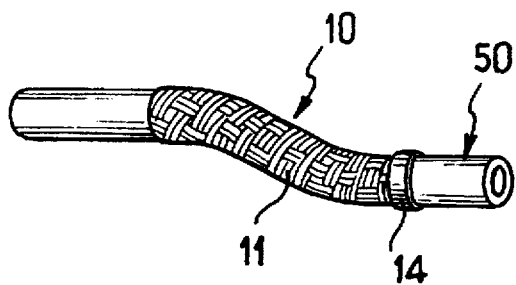

FIGS. 3a to 3c show the steps of putting the above-described sleeve 10 into place on a tube 50, said tube being merely an example of an elongate element that can be protected by a braided sheath sleeve implemented in accordance with the invention.

The expanded end 13 of the braided sheath sleeve 10 together with its pre-shrunk ring 14 is thus presented to one end of the tube 50 (FIG. 3a) so as to be threaded over said tube as far as the desired position as shown in FIG. 3b. Once the braided sheath has been stretched lengthwise so as to eliminate any "push-back" effect, it suffices to heat the expanded end 13 of the sleeve 10 again so as to complete shrinkage of the ring 14, thereby clamping said end on the outside surface of the tube 50 while simultaneously reactivating the adhesive initially provided on the inside face of the heat-shrink ring 14 or between the component filaments, thereby fixing the position of the sleeve 10 on the tube 50 by means of the adhesive in the ring 14 and/or the clamping force exerted by said ring. This leads to a cylindrical type sleeve being obtained in the end, having a ring of plastics material at at least one of its ends giving the appearance of a collar, as can be seen in FIG. 3c.

Under all circumstances, precautions are taken to ensure that the adhesive of the ring melts under the effect of a rise in temperature up to the temperature enabling the heat-shrink ring to be pre-shrunk. The adhesive is characterized by flowing in the heated state, and by sticking after cooling. It is possible to use any conventional type of adhesive such as hot-melt adhesive, for use with a heat-shrink ring made of a plastics material such as EVA, polyamide, polyethylene, polyimide, or a combination of such polymers.

A simple manner of obtaining a ring having an adhesive inside face consists in cutting out lengths of desired width from a tubular sheath that has already been coated in adhesive. For a ring having a non-adhesive inside face, it is naturally also possible to cut up a tubular sheath. In all circumstances, the tubular sheath may be selected so as to have a color that is predetermined for the purposes of identification marking.

FIGS. 4a to 4d are diagrams showing the steps of manufacturing a sleeve of the above-mentioned type, from a length of braided sheath, with a heat-shrink ring having an adhesive inside face, and using a method of the invention:

FIG. 4a: one end of the length 11 of the braided sheath is threaded onto a shaping mandrel 100 so as to expand said end; the shaping mandrel 100 has a side wall 101 that is substantially frustoconical in this case (in a variant it could be cylindrical and of appropriate diameter), and a shoulder 102 against which the free edge 12 of the length of sheath 11 is brought to bear;

FIG. 4b: since the expanded end 13 of the length of sheath now has the desired shape, because of the shaping mandrel 100, it is possible to thread on the heat-shrink ring having an adhesive inside face 14 starting from the opposite end of the length of sheath, and to bring the ring into position around the expanded end 13 presently bearing against the shoulder 102, such that the ring 14 comes to rest exactly at the same level as the free edge 12 of the expanded end 13;

FIG. 4c: local heating, represented herein by radial arrows, is applied to the expanded end 13 so as to obtain a temperature which is sufficient to pre-shrink the ring 14 onto the outside surface of the expanded end 13 of the length of braided sheath 11. The necessary heat may be provided by hot air heating means, by infrared heating means, or by dipping in hot water. If precautions are taken for the heat-shrink ring to have a diameter prior to shrinkage that is 15% to 20% greater than the outside diameter of the braided sheath in its expanded position on the mandrel 100, optimum shrinkage is achieved while complying with the temperature characteristics of the components of the braided sheath and with the shrink temperature of the heat-shrink sheath. Since shrinkage takes place while the ring is free, optimum distribution of the masses of the heat-shrink ring is obtained around the braided sheath. In practice, the shrinkage time is determined both by the amount of clamping that is desired between the heat-shrink ring and the braided sheath, and by the adhesive coating the inside face of the ring or present on the heat-shrink inside wall of said ring, flowing between the strands of the braid, thus serving to hold the end of the braided sheath in its expanded shape. The quantity of adhesive is optionally selected to be large enough to ensure that adhesive passes between the filaments of the braid making it possible, during final shrinkage, to stick the end of the sleeve directly onto the elongate element to be protected. Given that the shrinkage which takes place when the end of the length of sheath is still on its shaping mandrel is partial only, it is preferable to leave it to cool for a sufficiently long period of time to enable the circumferential dimension of the heat-shrink ring to stabilize and to prevent shrinkage continuing because of the heat, it being possible to improve the time required by dipping the sheath in cold water while still in place on the mandrel; and FIG. 4d: once the pre-shrinkage of the heat-shrink ring 14 has stabilized, the shaping mandrel can be removed.

Thus, the manufacturing method used comprises the following successive steps:

one end of the length 11 of braided sheath is threaded onto the shaping mandrel 100 so as to expand said end;

the heat-shrink ring 14 having an inside face that is adhesive when hot is threaded from the other end of the length 11 so as to surround the expanded end 13, at least up to the free edge 12 thereof;

the expanded end 13 covered in this way is heated until the ring 14 heat shrinks, and the adhesive of said ring melts;

the expanded end is cooled to stabilized the circumferential dimension of the ring 14 and to set the adhesive of said ring; and finally, the shaping mandrel 100 is removed from the corresponding end of the length 11 of braided sheath.

As mentioned above, the adhesive of the ring is activated when heat is applied to pre-shrink said ring on the expanded end of the length of sheath, such that the inside wall of the sheath (wall 16) can present traces of adhesive to a greater or lesser extent. Consequently, to facilitate extraction of the shaping mandrel, it is advantageous for said mandrel to be made of a material having a low coefficient of friction, e.g. by selecting a material such as polytetrafluoroethylene.

For a heat-shrink ring having a non-adhesive inside face, the above-described method is modified little, and FIGS. 4a to 4d remain valid. The difference then lies essentially in the presence of a step during which a certain quantity of adhesive is deposited on the end of the braided sheath length, with such deposition being performed either after shaping (e.g. by means of a brush) or before shaping (e.g. by dipping in a bath of adhesive).

In the first variant, the step of depositing adhesive is an intermediate step (not shown in the figures) that takes place between the situations shown in FIGS. 4a and 4b, with a certain quantity of adhesive being deposited on the expanded end (e.g. by means of a brush).

The manufacturing method used then comprises the following successive steps:

one end of the length 11 of braided sheath is threaded onto a shaping mandrel 100 so as to expand said end;

a certain quantity of adhesive is deposited, e.g. by means of a brush, on the end 13 expanded in this way;

a heat-shrink ring 14 having an inside face that is non-adhesive when hot is threaded from the other end of the length 11 so as to surround the adhesive-coated expanded end 13, at least up to the free edge 12 thereof;

the expanded end 13 covered in this way is heated until the ring 14 heat-shrinks, and the adhesive deposited on said end melting;

the expanded end 13 is cooled to stabilized the circumferential dimension of the ring 14 and to set the adhesive included in said end; and finally, the shaping mandrel 100 is removed from the corresponding end of the length 11 of braided sheath.

In the second variant, the step of depositing adhesive is a preliminary step (not shown herein) and takes place before the situation shown in FIG. 4a, with a certain quantity of adhesive being deposited on the as yet unexpanded end. This deposition can be performed by dipping in a bath of adhesive, in particular using an adhesive composition in the form of a powder or a suspension.

The above-explained manufacturing method is then modified with respect to its two first steps, as follows:

one end of the length 11 of braided sheath is dipped in a bath of adhesive; and the end 13 that is adhesive-coated in this way is then threaded over a shaping mandrel 100 so as to expand said end.

After these two steps, the ring is put into place and heat-shrunk in a manner identical to that descried above.

FIGS. 5 and 6 show a variant braided sheath sleeve of the invention having two expanded ends, one of which is fitted with a ring that extends beyond the free end edge.

There can thus be seen a sleeve 20, whose main portion 21 of braided sheath has a first expanded end 23 coated in a pre-shrunk ring 24 that is flush with its free edge 22 in the manner described above. The other end 23 of the sleeve 20 has a ring 27 that is likewise heat-shrinkable and that optionally has an adhesive inside face, but which unlike the ring 24 extends beyond the free edge 22 of the expanded end in question. The resulting extension is referenced 27.1. In FIG. 6, there can be seen the disposition of the braided sheath sleeve 20 having two rings 24 and 27. Reference 28 designates the inside face of the extended ring 27, and reference 29 designates the inside face of the braided sheath 21. The extension 27.1 is preferably flared so as to facilitate installing the sleeve via its extended ring 27 which then constitutes a genuine handling endpiece.

This is particularly advantageous when a slack type braided sheath is used (e.g. constituted by multi-filaments of polyester or other polymers), as shown in FIG. 7, with such a sheath otherwise being particularly difficult to thread onto an elongate and angled tube 50. The flared endpiece formed by the ring 27 makes it easy to position the end of the sleeve on the end of the tube 50, and then to draw the sleeve progressively along said tube. Once the sheath sleeve has been put into place in its final position on the tube 50, it then suffices to proceed with final shrinking of the ring 27, the sleeve 20 then being fixed in position by the adhesive and/or by the clamping exerted by the ring 27. Naturally, the preceding effect can be found at the expanded end of the braided sheath, with adhesive migrating from the ring 27 to the inside face of the braided sheath. In addition, additional sticking may be obtained by the adhesive present on the extension 27.1 of the ring 27. Under such circumstances, the extension 27.1 of the ring participates in fixing the sleeve in position by means of the adhesive on its inside face. In a variant, the extension 27.1 of the ring 27 can be considered as a discardable piece which is eliminated once the sleeve has been put into place (in which case it is preferable to use a ring whose inside face is not adhesive).

FIGS. 8a to 8d are diagrams showing the steps in making such a sleeve having an extension ring in the same manner as the steps in making the preceding sleeve as shown in FIGS. 4a to 4d:

FIG. 8a: the end of the length 21 of the braided sheath is threaded onto a shaping mandrel 110 until its free edge 22 comes into abutment against a shoulder 112 defining the frustoconical face 111 of said mandrel;

FIG. 8b: a heat-shrinkable ring 27 having an inside face 28 that is adhesive when hot is threaded over the opposite end of the length 21 until it surrounds the expanded end 23: in this case, a second shoulder 113 is provided on the shaping mandrel 110 and this shoulder is used to position the extension ring 27 properly;

FIG. 8c: the expanded end 23 as coated in this way is heated until the ring 27 shrinks, and the adhesive of said ring melts; and FIG. 8d: after the expanded end 23 has cooled sufficiently and the circumferential size of the preshrunk ring 27 has stabilized sufficiently, it is possible to remove the shaping mandrel 110.

For a ring 27 having an inside face that is not adhesive when hot, either an intermediate step is performed between the positions shown in FIGS. 8a and 8b, said intermediate step consisting in depositing a certain amount of adhesive (e.g. by means of a brush) on the expanded end 23, or else a preliminary step is performed before the position shown in FIG. 8a, which preliminary step consists in dipping the still unexpanded end in a bath of adhesive, as already explained for the preceding variant.

Also, as shown in FIGS. 1 and 5, it is possible to provide for the ring 14 (or 27) to have external identification marking. The marking may be performed hot, by thermal transfer, by stamping, etc. . . . on the heat-shrinkable ring, or by using a heat-shrinkable sheath of a special color selected in advance and from which rings are cut off, so as to provide any required identification (numerical, alphabetical, alphanumerical, etc.). This constitutes an elegant use of an available free surface which was not available with prior art braided sheath sleeves, such marking previously being envisagable only on conditional flexing means such as collars, etc.

A braided sheath sleeve is thus provided which is both convenient to thread and simple to fix once it has been put into place, and this applies to a very wide variety of braided sheaths.

The invention is not limited to the embodiments described above, but on the contrary covers any variant that uses equivalent means to reproduce the central characteristics specified above.

We claim:

1. A braided sheath sleeve for threading over at least one elongate element to be protected, wherein the sleeve has at least one expanded end having an expanded shape whose diameter is greater than a nominal diameter of the sleeve, said expanded end including a first adhesive between component filaments so as to maintain the expanded shape of said at least one end and being surrounded, at least as far as a free edge, by a ring of a heat-shrink plastic material, said ring being partially shrunk on the expanded end of the sleeve and being able to be further shrunk for clamping said expanded end onto said at least one elongate element.

2. A braided sheath sleeve according to claim 1, wherein the ring has an inside face coated with said first adhesive which melts at a shrinking temperature of said ring so as to migrate onto said at least one expanded end through the component filaments thereof.

3. A braided sheath sleeve according to claim 1, wherein the ring has a heat-fusible inside wall so that an inside face of the ring is adhesive at a shrinking temperature of said ring so as to produce said first adhesive which migrates onto said at least one expanded end through the component filaments thereof.

4. A braided sheath sleeve according to claim 1, wherein the ring has an inside face that is not adhesive at a shrinking temperature of said ring, and the first adhesive provided between the component filaments is selected to flow at the shrinking temperature of said ring so as to migrate onto said expanded end through the component filaments thereof.

5. A braided sheath sleeve according to claim 1, wherein the ring stops at the free edge of the expanded end.

6. A braided sheath sleeve according to claim 1, wherein the ring has an extension that extends beyond the free edge of the expanded end.

7. A braided sheath sleeve according to claim 6, wherein said extension of the ring is flared.

8. A braided sheath sleeve according to claim 6, wherein said extension of the ring has an inside face coated with a second adhesive.

9. A braided sheath sleeve according to claim 6, wherein said extension of the ring is discardable and is eliminated once the sleeve has been put into place.

10. A braided sheath sleeve according to claim 1, wherein the ring is externally marked and/or provided with identifying color.

11. A braided sheath sleeve according to claim 1, wherein both ends thereof have an expanded shape and include the first adhesive between their respective component filaments, each of said ends being surrounded by said heat-shrink ring.

12. A braided sheath sleeve according to claim 11, wherein said heat-shrink ring has an inside face that is adhesive at a shrinking temperature of said ring.

13. A braided sheath sleeve according to claim 11, wherein said heat-shrink ring has an inside face that is not adhesive at a shrinking of said ring.

* * * * *